(12) United States Patent
Liu et al.

(10) Patent No.: US 7,292,602 B1
(45) Date of Patent: Nov. 6, 2007

(54) EFFICIENT AVAILABLE BANDWIDTH USAGE IN TRANSMISSION OF COMPRESSED VIDEO DATA

(75) Inventors: Xiaomei Liu, Milpitas, CA (US); Sangeeta Ramakrishnan, San Jose, CA (US)

(73) Assignee: Cisco Techonology, Inc., San Jose, CA (US)

(*) Notice: Subject to any disclaimer, the term of this patent is extended or adjusted under 35 U.S.C. 154(b) by 1020 days.

(21) Appl. No.: 10/034,057

(22) Filed: Dec. 27, 2001

(51) Int. Cl.
*H04J 3/16* (2006.01)

(52) U.S. Cl. .................. 370/468; 370/437; 375/240.01

(58) Field of Classification Search ..................... None
See application file for complete search history.

(56) References Cited

U.S. PATENT DOCUMENTS

| | | | |
|---|---|---|---|
| 5,861,919 A | | 1/1999 | Perkins et al. |
| 5,862,140 A | | 1/1999 | Shen et al. |
| 6,038,256 A | * | 3/2000 | Linzer et al. .......... 375/240.12 |
| 6,094,457 A | * | 7/2000 | Linzer et al. .......... 375/240.12 |
| 6,181,711 B1 | | 1/2001 | Zhang et al. |
| 6,192,083 B1 | * | 2/2001 | Linzer et al. .......... 375/240.29 |
| 6,418,122 B1 | * | 7/2002 | Schoenblum et al. ....... 370/252 |
| 6,434,197 B1 | * | 8/2002 | Wang et al. ............ 375/240.29 |
| 6,594,271 B1 | * | 7/2003 | Wu et al. .................... 370/412 |
| 6,674,796 B1 | * | 1/2004 | Haskell et al. ......... 375/240.01 |
| 6,847,656 B1 | * | 1/2005 | Wu et al. .................... 370/477 |
| 2001/0038668 A1 | * | 11/2001 | Gatepin .................. 375/240.02 |
| 2002/0110193 A1 | * | 8/2002 | Yoo et al. .............. 375/240.02 |
| 2002/0131496 A1 | * | 9/2002 | Vasudevan et al. .... 375/240.11 |
| 2002/0136298 A1 | * | 9/2002 | Anantharamu et al. 375/240.12 |
| 2003/0043908 A1 | * | 3/2003 | Gao ....................... 375/240.12 |

OTHER PUBLICATIONS

Zhang, et al., "Methods And Apparatus For Efficient Scheduling And Multiplexing", U.S. Appl. No. 09/684,623, filed Oct. 5, 2000, 62 pages.
Huifang Sun, et al., *Architectures for MPEG Compressed Bitstream Scaling*, IEEE Transactions on Circuits and Systems for Video Technology, vol. 6, No. 2, Apr. 1996, pp. 191-199.
Wei Ding, *Joint Encoder and Channel Rate Control of VBR Video over ATM Networks*, IEE Transactions on Circuits and Systems for Video Technology, vol. 7, No. 2, Apr. 1997, pp. 266-278.
ISO/IEP *Information Technology-Generic Coding Of Moving Pictures And Associated Audio: Systems*, ISO/IEC 13818-1, Nov. 13, 1994, 135 pages.
ISO/IEP *Information Technology-Generic Coding Of Moving Pictures And Associated Audio Information: Video*, ISO/IEC 13818-2, 1995, 209 pages.

* cited by examiner

*Primary Examiner*—Bob A. Phunkulh
(74) *Attorney, Agent, or Firm*—Beyer Weaver LLP (57) ABSTRACT

Described herein are systems and methods for multiplexing and transmitting video data. The systems and methods use excess bandwidth in a channel available after meeting minimum transmission requirements for all bitstreams. A network device of the invention flexibly allocates this available bandwidth to minimize further rate reduction. More specifically, the network device periodically determines the available bandwidth, and divides the available bandwidth among multiple incoming bitstreams being multiplexed in order to increase downstream decoder buffer levels. By maintaining increased decoder buffer levels, future rate reduction of the video data may be avoided or applied to a lesser degree. Minimizing rate reduction in this manner improves bandwidth usage efficiency, and thus improves video data transmission and end-user output video quality.

22 Claims, 4 Drawing Sheets

EFFICIENT AVAILABLE BANDWIDTH USAGE IN TRANSMISSION OF COMPRESSED VIDEO DATA

BACKGROUND OF THE INVENTION

The present invention relates generally to systems and methods for transmitting data. More specifically, the present invention relates to efficient transmission of video data over shared transmission of channels.

Video services are provided by a wide array of video content suppliers. For example, residential digital video services may include digital television, video on demand, Internet video, etc.—each service having hundreds of programs. A program refers to one or more bitstreams that are used to represent the video content and associated audio content. A target receiver for the programs, such as a set-top box (STB) located in a residential home, receives video programs from a number of different video content suppliers via assorted transmission channels. Typically, the 'last mile' of transmission between the video content suppliers and the target receiver is along the same transmission channel, requiring the channel to carry multiple video programs from the wide array of suppliers—and often simultaneously.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. Many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent video, audio and/or data. A bit rate is the number of bits per second required to transport the bitstream. A bit error rate is the statistical ratio between the number of bits in error due to transmission and the total number of bits transmitted. A channel capacity is the maximum bit rate at which a given channel can convey digital information with a bit error rate no more than a given value.

Since transmission of video data with existing communication channels is often excessive, compression is an approach that has been used to make digital video images more transportable. Digital video compression allows digitized video data to be represented in a much more efficient manner and makes it possible to transmit the compressed video data using a channel at a fraction of the bandwidth required to transmit the uncompressed video data. Compression represents significant data savings which results in much more efficient use of channel bandwidth and storage media.

When digital video is first compressed, the encoder assumes a particular bit rate profile, whether it is constant bit rate (CBR) or a variable bit rate (VBR). The word "profile" refers to the fact that transport bit rate may not be constant, but variable under certain constraints, such as peak bit rate, average bit rate, minimum bit rate, etc. The VBR representation of compressed video data allows a video encoder to generate compressed bitstreams that, when decoded, produce consistent video quality. However, as a result of the compression process, the number of bits required to represent the compressed data differs widely from picture to picture. The specific VBR characteristics of the compressed bitstream depends on the complexity of the video image, amount of motion in the video sequence, as well as changes made in post-generation such as scene cuts, fades, wipes, picture-in-picture, etc. As channel capacities are often expressed as constant bit rates, the variable nature of VBR compressed bitstream often poses a problem for video transmission.

To further reduce the transmission load, bitstreams are frequently combined for transmission within a channel. A multiplex is a scheme used to combine bitstream representations of multiple signals, such as audio, video, or data, into a single bitstream representation.

A multiplexer then refers to an apparatus or software designed or configured to multiplex multiple bitstreams using a suitable multiplex scheme. Two functions of the multiplexer are a) scheduling packets including the video data and b) rate control of the video data. When there is sufficient bandwidth on the outgoing channel to send all the video data, the multiplexer simply schedules all the packets to send out.

If the channel bandwidth is not enough, rate reduction is used to decrease the bandwidth required to send the video data. The rate reduction may include re-quantization with a larger quantization step value or complete re-encoding, for example. After suitable rate reduction, the multiplexer then schedules the packets for transmission. Rate reduction often diminishes end-user video quality. Since rate reduction often leads to picture quality degradation, it should be minimized. However, many conventional transmission systems overestimate the amount of rate reduction necessary, leading to diminished output video quality.

Based on the foregoing, improved methods and systems for transmitting video data over transmission channels would be desirable.

SUMMARY OF THE INVENTION

The present invention provides improved systems and methods for multiplexing and transmitting video data. The systems and methods use excess bandwidth in a channel made available after meeting the minimum requirement for all transmitting multiple bitstreams to each meet downstream decoder buffer requirements. A network device of the invention flexibly allocates this available bandwidth to minimize further rate reduction in the future. More specifically, the network device periodically determines the available bandwidth, and divides the available bandwidth among multiple incoming bitstreams being multiplexed in order to increase downstream decoder buffer levels. By maintaining increased decoder buffer levels, future rate reduction of the video data may be avoided. Minimizing rate reduction in this manner improves bandwidth usage efficiency, and thus improves video data transmission and end-user output video quality.

In one aspect, the present invention relates to a network device for transmitting compressed video data onto a channel. The network device comprises a bit rate converter designed or configured to transcode compressed video data. The network device also comprises a multiplexer designed or configured to a) schedule packets from the multiple bitstreams; and b) periodically determine if bandwidth is available on the channel prior to or after transcoding is performed on the compressed video data, and if so, allocating additional packets from the multiple bitstreams to use the available bandwidth. The network device additionally comprises a network interface designed or configured to output data packets from the bitstreams onto the channel.

In another aspect, the present invention relates to a method for transmitting compressed video data onto a channel. The method comprises receiving multiple bitstreams, each bitstream including compressed video data contained in packets. The method also comprises transcoding compressed video data in one or more of the multiple bitstreams. The method further comprises scheduling the packets from the multiple bitstreams. The method additionally comprises determining an available bandwidth on the channel. The method also comprises allocating the available bandwidth to one or more of the multiple bitstreams. The method further comprises transmitting data packets from each of the multiple bitstreams onto the channel.

In yet another aspect, the present invention relates to a network device for transmitting compressed video data onto a channel. The network device comprises means for receiving multiple bitstreams, each bitstream including compressed video data contained in packets. The network device also comprises means for transcoding compressed video data in one or more of the multiple bitstreams. The network device further comprises means for scheduling the packets from the multiple bitstreams. The network device additionally comprises means for determining an available bandwidth on the channel. The network device also comprises means for allocating the available bandwidth to one or more of the multiple bitstreams. The network device further comprises means for transmitting data packets from each of the multiple bitstreams onto the channel.

In still another aspect, the present invention relates to a computer readable medium including instructions for transmitting compressed video data onto a channel. The instructions comprise instructions for receiving multiple bitstreams, each bitstream including compressed video data contained in packets. The instructions also comprise instructions for transcoding compressed video data in one or more of the multiple bitstreams. The instructions further comprise instructions for scheduling the packets from the multiple bitstreams. The instructions additionally comprise instructions for determining an available bandwidth on the channel. The instructions also comprise instructions for allocating the available bandwidth to one or more of the multiple bitstreams. The instructions further comprise instructions for transmitting data packets from each of the multiple bitstreams onto the channel.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

The present invention describes systems and methods to efficiently distribute bandwidth in a channel among multiple bitstreams. At a minimum, network devices of the present invention distribute channel bandwidth to guarantee no video underflow in a downstream decoder buffer. In some cases, the network devices also implement techniques to improve bandwidth usage and decoded video quality.

After rate control makes bitstream bandwidth demand meet channel bandwidth availability by performing necessary rate reduction, a bandwidth arbitrator of the present invention distributes the channel bandwidth to meet the transmission requirement to guarantee no underflow or overflow of the downstream decoder video buffers. In addition, the bandwidth arbitrator determines and allocates any excess, or 'available', bandwidth after rate control. As a result, downstream decoder buffer levels may receive and store more data than the minimum required to maintain continuous video output. As transmission proceeds, the increased decoder buffer levels permit decreased video delivery rates resulting from bitstream bandwidth demand that exceeds channel bandwidth, e.g., at a slower rate than that otherwise required to maintain the minimum decoder buffer level. Conventionally, transmission requirements that exceed channel bandwidth would lead to bit rate reduction, and video quality degradation. However, increased decoder buffer levels achieved by techniques of the present invention may endure periods of decreased transmission, and thus minimize rate reduction. In other words, the rate reduction can be avoided or can be done to a lesser degree.

Video data transmission according to the present invention may thus reduce video quality degradation resulting from bit rate reduction, and thereby improve video data delivery and quality. The present invention addresses bandwidth distribution in general, but details techniques related to this issue—improved video quality attained by intelligent usage of available bandwidth in a channel produced after meeting the minimum buffer level requirement.

Figure 1:
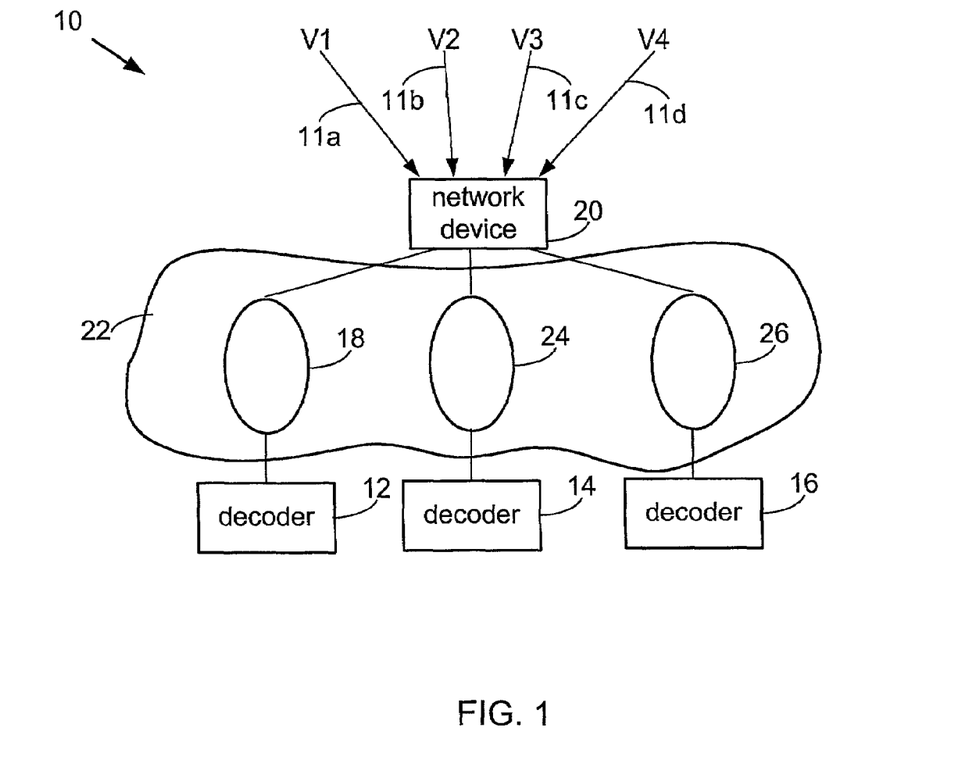
FIG. 1 illustrates an exemplary network system for transmitting compressed video data in accordance with one embodiment of the present invention.

Referring now to FIG. 1, an exemplary system 10 where bandwidth allocation in accordance with the present invention is particularly useful will be described. System 10 is responsible for transmitting compressed video data from multiple bitstreams 11a-d to target decoders 12, 14 and 16. Bitstreams 11a-d include compressed video data corresponding to video programs V1, V2, V3, and V4.

Network device 20 selectively transmits compressed video data from programs V1, V2, V3, V3, and V4. For each compressed bitstream output request, the network device 20 may multiplex compressed video data from bitstreams 11a-d. In some cases, network device 20 also converts the bit rate of video data to help the output multiplexed bitstream fit within the allowable channel bandwidth between the network device 20 and one of target decoders 12, 14 and 16.

Although the present invention will now primarily be discussed with respect to multiplexing, systems and methods of the present invention are also well suited for re-multiplexing. A re-multiplex is a scheme used to combine multiple bitstream representations of multiplexed signals into a single bitstream representation. In one embodiment, network device 20 employs statistical re-multiplexing techniques. Statistical re-multiplexing, also called statistical rate re-multiplexing, is a process which performs statistical multiplexing of bitstreams already in a compressed format. Thus, statistical re-multiplexing includes accepting multiple variable bit rate bitstreams, some of which may be received in a multiplex, and outputting a single constant bit rate bitstream that fits within a channel. In applications such as video on demand, digital cable headend systems, and digital advertisement insertion systems, statistical re-multiplexing may improve the overall system efficiency, resulting in better bandwidth usage and reduced transmission cost.

In some cases, such as within a telco environment, network device 20 is aware of the video content requests of a target decoder that it transmits to and the available bandwidth therebetween. Alternatively, e.g., in some cable environments, the network device 20 broadcasts multiple multiplexed video programs without specific requests from end user receivers. In some cable distribution networks, all compressed signals and programs are transmitted via network device 20 through local networks and then to the decoders. Network device 20 and local networks together form a distribution network for the compressed signals. In one exemplary cable distribution network, network device 20 is a so-called "super head-end" facility that feeds multiple multiplexed video programs to smaller regional head-ends within local networks via fiber optical networks (such as SONET or DWDM based networks). Each regional head-end in turn is connected to its own population of target decoders, i.e., multiple decoders like 12 are usually connected to a single regional head-end. In a typical telco scenario for example, the regional head-ends are telco central offices each connecting to a large number decoder/receivers via twisted phone wires (DSL).

In other cable distribution environments, the network device 20 selects video programs not based on individual end receiver request, but on a specific programming mix that the local cable operator plans to carry over their local cable distribution. By way of example, a local cable operator in San Jose, Calif. may carry services such as Discovery, CNN, HBO and ABC, and thus it receives and selects such programs via network device 20 and broadcasts them over their local cable distribution plant. Alternatively, a local operator in San Francisco may carry services such as CNN, CBS and ABC, and will provide programs accordingly. In this case, end-receivers and decoders do not participate in the selection process. In contrast, in the case of video on demand, end receivers have control on the selection of programming, which typically originates from a video server and connected by the network device via local or wide area networks.

Target decoder 12, for example, receives compressed video data from network device 20 through a local network 18. Local network 18 is included in a larger network 22 that also includes local networks 24 and 26, which service the target decoders 14 and 16, respectively. In one embodiment, network device 20 is a headend and local network 18 corresponds to a geographic service area of a cable network serviced by the headed. Decoder 12 may then correspond to a decoder included in a set-top box or personal computer located in a residential home. Decoder 12 decompresses the compressed video data into an uncompressed format for visual output to the user.

As each of the bitstreams 11a-d may have a dynamically varying variable bit rate (VBR), network device 20 distributes channel bandwidth to guarantee no video underflow in downstream decoder buffers 12, 14, and 16. In addition, network device 20 determines and allocates any excess, or 'available', bandwidth after meeting the minimum decoder buffer level requirement to transmit more data from bitstreams 11a-d to a target decoder. Scheduling in this manner may increase downstream decoder 12, 14 and 16 buffer levels and allow excess bandwidth to be dynamically allotted between bitstreams—thus improving video quality for the end-user.

Figure 2:
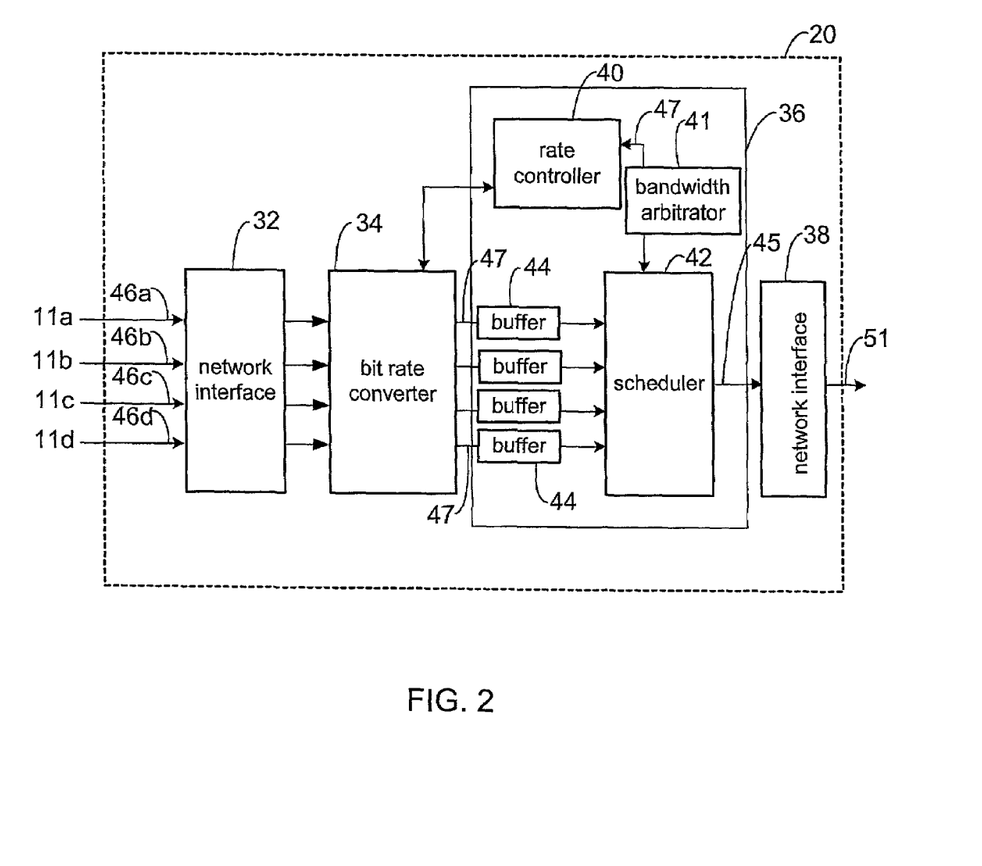
FIG. 2 is a block diagram of the network device included in the system of FIG. 1 in accordance with one embodiment of the present invention.

FIG. 2 illustrates a block diagram of network device 20 of FIG. 1, which provides multiplexed bitstreams including compressed video data, in accordance with one embodiment of the present invention. While the present invention will now be described as an apparatus composed of units, those skilled in the area will recognize that the present invention encompasses a method, process or software having as steps the actions performed by each unit and described below.

Network device 20 comprises: network interface 32, bit rate converter apparatus 34, a multiplexer 36, and a transmitter 38. Multiplexer 36 comprises a rate controller 40, a bandwidth arbitrator 41, and a scheduler 42. As one of skill in the art will appreciate, each of the structures of network device 20 may be a single hardware and/or software structure, multiple hardware and/or software structures, or combined in a more simple apparatus scheme.

Network interface 32 has a plurality of input lines 46a-d that receive bitstreams 11a-d from a variety of sources using suitable receiving components. For example, input line 46a is coupled to a satellite receiver that receives compressed video data from a satellite based communication system. Input line 46b receives compressed video data from an Internet network including a series of ATM based routers which route the compressed video data to network device 20. Input line 46c is coupled to a receiver that receives compressed video data from a terrestrial source and network interface 32 may also include a suitable frequency demodulation and descrambling facilities. The line 46d receives compressed video data from an Internet network using IP protocol that routes a compressed bitstream from a video streaming server to the network device 20.

Network device 20 may also include facilities to parse any timing, programming, video data, and other auxiliary information, as appropriate. The compressed video data is then provided to bit rate converter apparatus 34.

When necessary, bit rate converter apparatus 34 transcodes video data in one or more of the incoming bitstreams. Broadly speaking, transcoding refers to altering data or information in a bitstream without changing the format of the bitstream. When desirable, the network device 20 reduces the bit rate of the compressed video data transmitted in the output multiplex 45 based on the channel capacity of the channel between the network device 20 and the target decoder. Bit rate conversion of a bitstream refers to the process performed on compressed video data that results in a different transmission bit rate than the originally compressed video data. In a typical scenario, the new bit rate for the output multiplexed bitstream 34 is smaller than the original bit rates of the input bitstreams, but sometimes the resulting bit rate can also be greater than the original bit rates. The bit rate conversion may occur on any one or more of the bitstreams received by the network device 20. For example, bit rate converter apparatus 34 may adapt the bit rate of video data from bitstream 11a before transmitting it in a multiplex.

In some scenarios, output multiplexed bitstream 45 is delivered to different transmission channels each having a different channel capacity—and the bit rate for each channel may be tailored accordingly. By way of example, two bitstreams received at 4 Mbps and 2 Mbps (total input=6 Mbps) may be combined and bit rate converted by the bit rate converter apparatus 34 to a multiplexed transmission bitstream of 1.5 Mbps for a channel capable of delivering only 1.5 Mbps. The same bitstreams may also be combined and bit rate converted by the bit rate converter apparatus 34 to a compressed transmission bitstream of 3 Mbps for a channel capable of delivering only 3 Mbps. In this case, the data and bit rate conversion process is intended to remove bits from the modified compressed bitstreams so that the new bitstreams are still compliant to the given compression syntax, and can be decoded by a receiver, albeit at a possibly lower quality than the originally compressed bitstream. Bit rate conversion of a compressed bitstream is further described in commonly owned U.S. Pat. No. 6,181,711, which is incorporated by reference herein for all purposes. The output of bit rate converter apparatus 34 is provided onto output lines to buffers 44.

Coupled to bit rate converter apparatus 34 is multiplexer 36. Multiplexer 36 comprises scheduler 42, which is configured to receive the compressed video data from bitstreams 11a-d, either as received by network device 20 or as transcoded by bit rate converter apparatus 34. Bandwidth arbitrator 41 allocated bandwidth to each of the bitstreams. Scheduler 42 determines the relative order of data transmission from buffers 44. Scheduler 42 outputs a multiplexed bitstream 45 including compressed video data from bitstreams 11a-d. In one embodiment, multiplexed bitstream 45 has a substantially constant bit rate. Multiplexer 36 also includes rate controller 40 and a set of input buffers 44. Input buffers 44 temporarily store compressed video data received from bit rate converter apparatus 34 for each of the input bitstreams until scheduler 42 processes the compressed video data for transmission.

Rate controller 40 connects to both bit rate converter apparatus 34 and bandwidth arbitrator 41, and determines how much to rate reduce the video data from each input bitstream 11a-d. More specifically, based on messages received from rate controller 40, bit rate converter apparatus 34 adjusts the bit rate of compressed video data from each input bitstream. Rate controller 40 may rely on information regarding the channel that the output re-multiplexed bitstream 45 is to be transmitted onto. For example, rate controller 40 may be configured to receive a rate value from an RADSL transmitter in an ADSL embodiment or to receive a rate value from an ATM network in an ATM environment. A control signal is provided by the rate controller 40 to bit rate converter apparatus 34. The control signal specifies the amount of modifying the bit rate converter apparatus 34 performs to achieve the desired output bit rate from network device 20. Another control signal is provided by rate controller 40 to bandwidth arbitrator 41 that allocates bandwidth to each of the bitstreams based on control signals from rate controller 40.

Scheduler 42 comprises inputs coupled to each buffer 44, an input line from bandwidth arbitrator 41, and an output line coupled to network interface 38. Scheduler 42 selectively combines packets including compressed video data to form multiplexed bitstream 45. Scheduler 42 may also insert any headers, stuffing bits, filler packets as appropriate.

In one embodiment, multiplexer 36 is a statistical multiplexer. A statistical multiplexer is a multiplexer that takes advantages of the statistical behavior of video data to minimize the total bandwidth usage of video data from multiple bitstreams. More specifically, the statistical multiplexer takes advantage of the variable bit rate (VBR) nature of multiple bitstreams comprising compressed video data. In one embodiment, when scheduler 42 combines multiple bitstreams, the bit rate of each incoming VBR bitstream may be adjusted but the total bit rate of the output multiplexed compressed bitstream 45 is kept at a substantially constant value. When a statistical multiplexer combines multiple bitstreams, an algorithm may be used to adapt the bit rate of each VBR video signal but the total bit rate of the output multiplex is kept at a constant value. In a specific embodiment, network device corresponds to a RateMux C6900, or a multiple or media linecard product, as implemented in a router as described in further detail with respect to FIG. 4.

When there is sufficient bandwidth on the outgoing channel to transmit all the outgoing multiplexed video data, scheduler 42 simply schedules all the packets to send out—without transcoding—such that the minimum bandwidth requirement to not underflow the downstream decoder video buffer levels is met. To ensure each video channel's normal operation, there is typically a minimum bandwidth requirement just to not underflow the decoder video buffer. This minimum bandwidth is calculated as accurately as possible by bandwidth arbitrator 41 based on the variable rate compressed data being continually received. In one embodiment, scheduling and statistical multiplexing in the initial multiplexing pass includes one or more of the following procedures:

analysis of video content to determine the optimal bit budget allocation for each input bitstream and possible impact on underlying video quality at different bit budget allocations.

coded picture decisions such as whether to use motion compensation.

picture coding for each input bitstream that meets the bit usage budget determined by the previous procedure, also called rate control as described above with respect to the bit rate converter 34.

monitoring and compensation of timing information on all bitstreams, e.g., in order to carry real-time compressed bitstreams.

coordinated selection of bit rates across all input bitstreams to result in a total fixed rate.

scheduling and multiplexing of different bitstreams into a fixed bandwidth channel.

When there is insufficient bandwidth, compressed video data from one or more bitstreams is transcoded to reduce the output bit rate of the multiplex. Often, bit rate conversion overestimates the amount of reduction necessary to fit within the allowable bandwidth. As a result, there may be excess bandwidth available after transcoding.

If there is available bandwidth, and after meeting the minimum requirement, bandwidth arbitrator 41 allocates the excess bandwidth to each of the bitstreams appropriately. More specifically, rate controller 40 and bit rate converter apparatus 34 make the channel bandwidth demand meet bandwidth availability, and bandwidth arbitrator 41 applies a two pass scheduling technique. In the initial pass, bandwidth arbitrator 41 distributes bandwidth to meet the bandwidth requirement of each individual channel to guarantee no underflow in downstream decoder buffer levels. In the second pass, bandwidth arbitrator 41 flexibly allocates left over bandwidth wisely to minimize future rate reduction.

The leftover available bandwidth can be used for future bandwidth need by increasing downstream decoder buffer levels. In one embodiment, bandwidth arbitrator 41 models downstream decoder buffer levels corresponding to each output channel. Video buffer level provides an estimate on future bandwidth need for a decoder. When the video buffer level is low, it is more likely to need rate reduction in the future. In order to avoid rate reduction in the future, bandwidth arbitrator 41 increases the video buffer level as much as possible with the leftover available bandwidth after the initial scheduling. Bandwidth arbitrator 41 also computes the minimum bandwidth requirement such that each decoder buffer maintains at least a certain minimum level.

Arbitration of bandwidth in this manner is an effective way to optimize the quality of compressed video signals under the constraint of a fixed total transmission bandwidth, e.g., one imposed by the outgoing channel capacity. The resulting improvement can be described in terms of the so called 'statistical gain', which can be measured either in terms of the improvement of subjective visual quality of the decoded video, or the objective average amount of rate reduction used, etc. Over time, transferring saved bandwidth in this manner may result in improved video quality for the end-user.

In a specific embodiment, the number of bits in each downstream decoder buffer may be used to determine which decoder benefits from available bandwidth. Measurement in bits may not be appropriate in some cases, such as when a multiplex consists of bitstreams of vastly different bit rates, since for high bit rate channels downstream video buffer levels are higher in terms of bits than for low bit rate channels. Measurement in frames or time may be used instead. For example, picture time provides a useful estimate for modeling downstream decoder buffer levels. Here, rate controller 40 estimates enough time in the decoder for 'x' frames or pictures to be decoded and output. The minimum buffer level (or acceptable level just above underflow point) may also be also measured in units of time, rather than bits or packets. In practical implementations where buffer levels are modeled, the minimum bandwidth requirement is also computed by bandwidth arbitrator 41 in units of time or in bits. Namely, bandwidth arbitrator 41 computes the downstream decoder buffer levels such that each decoder buffer maintains at least a certain minimum bit or temporal level.

The available bandwidth after meeting the minimum decoder buffer level requirement may be divided among the transmission channels flexibly. In one embodiment, bandwidth arbitrator 41 allocates the available bandwidth substantially equally among the multiple bitstreams. In another embodiment, bandwidth arbitrator 41 allocates the available bandwidth according to the downstream buffer levels of each channel.

When each of the downstream decoder buffer levels is modeled, bandwidth arbitrator 41 may be configured such that it maintains buffer levels at a substantially equal level across each of the decoders, e.g., those channels with lower buffer level will receive relatively more bandwidth. Preferably, bandwidth arbitrator 41 uses the available bandwidth to maximize the downstream decoder buffer levels. If all the downstream decoder buffer levels are full, this second scheduling pass may be omitted. Here, the video transmission system is operating efficiently, and may accommodate decreases in video delivery rates, and corresponding decoder buffer level drops associated with insufficient channel bandwidth that would normally result in transcoding and degraded video quality.

In one embodiment, bandwidth arbitrator 41 determines how much of the available bandwidth to provide each downstream decoder according to the number of incoming bitstreams. In another embodiment, bandwidth arbitrator 41 determines how much bandwidth to provide each downstream decoder according to the channel bit rate, and inversely proportional to the downstream decoder buffer levels of each channel. In a specific embodiment, bandwidth arbitrator 41 allocates the available bandwidth in a normalized manner between all the available downstream decoders. Namely, $$A = A_{total} * (\text{channel bit rate/ddbl})/\text{SUM of (channel bit rate/ddbl))} \quad (1)$$

where A represents the proportion of available provided to an individual downstream decoder, $A_{total}$ represents the total available bandwidth after the initial allocation to meet the minimum buffer level requirement (as determined by bandwidth arbitrator 41), and ddbl represents the current downstream decoder buffer level as modeled by bandwidth arbitrator 41. The channel bit rate refers to the instantaneous channel bit rate at a current time, and it is understood that this may vary. Effectively, equation (1) provides each downstream decoder an inverse proportional space according to the decoder's buffer level, and normalizes the available bandwidth among all the individual downstream decoders.

In another embodiment, bandwidth arbitrator 41 measures how much of the available bandwidth to provide each downstream decoder according to the minimum bandwidth requirement. In this case, available bandwidth allocation is proportional to the minimum bandwidth requirement of the channel. Namely, $$A = \text{leftover bandwidth} * (\text{minimum send rate})/(\text{sum of minimum send rates}) \quad (2)$$

where the minimum send rate refers to the minimum bit rate needed to send bits for each downstream decoder that can minimally avoid buffer underflow at the decoding time of video output, and the sum of minimum send rates is determined according to the sum of the minimum send rate for each channel and its associated downstream decoder. Due to the dynamic environment in transmitting multiple bit streams through network device 20, bandwidth arbitrator 41 updates the minimum send rate after video bandwidth distribution to reflect the current state of the output channel.

It is understood that the exact bandwidth allocation provided by bandwidth arbitrator 41 may vary over time. Thus, equations (1) and (2), as well as other suitable allocation schemes, may be dynamically applied and switched as desired. For example, equation (1) is well suited for use when downstream decoder buffer levels across all the downstream decoders is different. In contrast, equation (1) is well-suited for use when the buffer levels maintained across all the decoders is substantially uniform.

The estimation and allocation of available bandwidth to the downstream decoders is performed at periodic intervals by network device 20. For example, bandwidth arbitrator 41 may periodically estimate the available bandwidth on a temporal interval. In this case, bandwidth arbitrator 41 models the downstream decoder buffer levels on a temporal basis as well, and updates the modeled buffer levels periodically. Periodic increments in the range of about 10 milliseconds to about 250 milliseconds are suitable for many video transmission applications. Alternately, when bandwidth arbitrator 41 models downstream decoder buffer levels on a bit or packet basis, bandwidth arbitrator 41 may estimate the available bandwidth and scheduler 42 may perform scheduling on a bit or packet interval. For example, periodic increments in the range of about 100 packets to about 4000 packets is suitable for many applications using a 27 Mbps (mega bits per second), but the number of packets will vary with the output channel capacity.

Periodic estimation of available bandwidth and downstream decoder buffer levels, and scheduling according to the present invention, may vary with several factors, such as the output channel capacity. Alternately, CPU speed of a processor implemented in network device 20, or other hardware design restraints, may slow the processing speed of network device 20 and thereby mandate a larger periodic increments. One of skill in the art will appreciate suitable periodic ranges for specific video transmission applications. Depending on system hardware implementation, a scheduling interval may be chosen to balance CPU cycles and hardware performance requirements. In general, scheduling the available bandwidth on a periodic and updated basis in this manner allows the available bandwidth and downstream decoder buffer levels to reflect the current and adaptive state of channel bandwidth availability.

The output of scheduler 42 and multiplexer 36 is multiplexed bitstream 45, which is provided to network interface 38. Network interface 38 is configured to transmit the multiplexed bitstream 45 including the scheduled compressed video data onto a suitable channel. Network interface 38 has a plurality of output lines that transmit bitstreams to a variety of sources using suitable transmitting components. For example, network interface 38 may comprise a transmitter known in the art for DSL networks. Network interface 38 may also comprise a transmitter known in the art for IP networks, for example. In a specific embodiment, the output medium is an Internet network where network interface 38 transmits through a series of nodes, which route the multiplexed bitstream to a suitable receiver. Network interface 38 may also comprise a transmitter known in the art for ATM networks, for example. In a specific embodiment, the output medium is an Internet network where network interface 38 transmits through a series of ATM based routers which route the MPEG-2 compressed video data to a suitable receiver. The output of network interface 38 forms the output 51 of network device 20.

Figure 3:
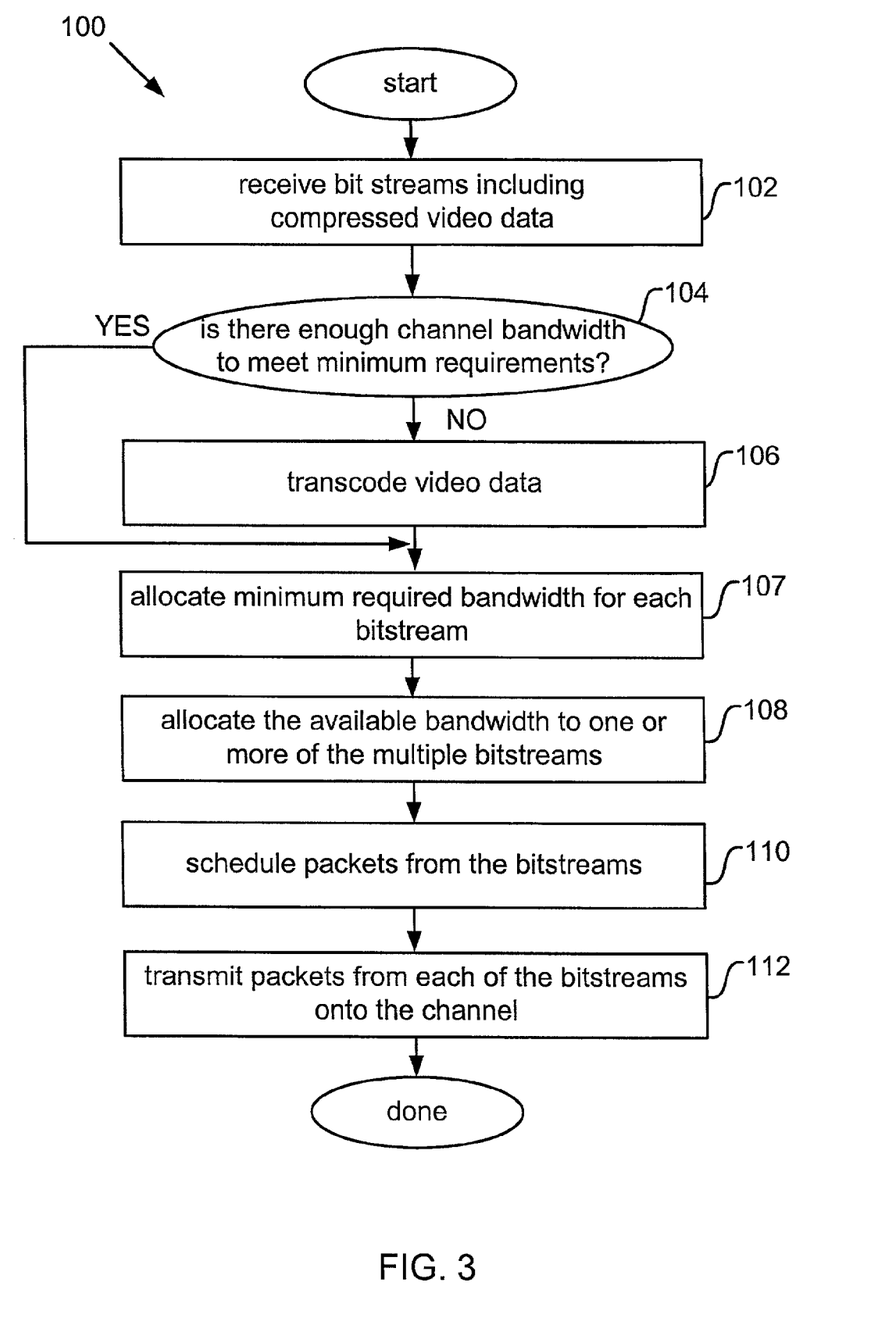
FIG. 3 illustrates a process flow for transmitting compressed video data onto a channel in accordance with one embodiment of the present invention.

FIG. 3 illustrates a process flow 100 for transmitting compressed video data onto a channel in accordance with one embodiment of the present invention. Process flow 100 may take place in any network device such as the network device 20 of FIG. 2. Processes in accordance with the present invention may include up to several additional steps not described or illustrated here in order not to obscure the present invention. While scheduling will now be described as a method, those skilled in the area will recognize that the present invention encompasses a system or software having units capable of performing the actions as described below.

The process flow 100 begins by receiving multiple bitstreams each including compressed video data contained in packets (102) from one or more sources, such as satellite and Internet sources. Often, compressed video data as received has a variable bit rate profile. When there is sufficient bandwidth to send all the video channels, transcoding (106) may be skipped.

If the channel bandwidth is not enough to meet delivery needs for all the incoming video data, rate reduction is used to decrease the bandwidth requirement to meet the available bandwidth. Transcoding (106), such as bit rate conversion, may be performed on any one of the compressed bitstreams to be multiplexed. Bit rate alteration of one or more of the compressed bitstreams may be based on the bit rate capacity of the channel between the network device and the target decoder. In some embodiments, a compressed bitstream may be partially encoded or decoded to facilitate transcoding. The bit rate alteration may then occur on compressed video data, uncompressed video data, or at any partial compression status therebetween. By way of example, the bit rate alteration may include partial decoding, re-quantization, and VLC encoding to reduce redundancy and produce compressed video data with less information and a lower bit rate. Alternatively, the bit rate alteration may include full or partial decoding and downsampling that takes a high resolution video data and converts it to lower resolution video data. In another embodiment, the present invention relates to bit rate alteration methods that use a combination of bit rate alteration techniques. Once the rate control has ensured that there is sufficient bandwidth for all bitstreams, the minimum bandwidth needed to avoid underflow of decoder buffers is allocated to each bitstream (107).

Process flow 100 then determines the left over bandwidth on the channel after meeting the minimum requirements. Available bandwidth is computed as the difference between the total output bandwidth of the channel and the sum of the bandwidth needed for each individual bitstream to ensure it does not underflow the decoder buffer. In other words, it is the difference between the total output channel capacity and the sum of the bandwidth allocated in the previous step (107). As mentioned before, this determination may occur on a periodic bit, temporal, or packet, basis. The available bandwidth is then allocated to one or more of the multiple bitstreams (108) in a manner so as to increase the decoder buffer levels across all the bitstreams.

As a result, the decoder buffer levels may receive and store more data than the minimum required to maintain the minimum continuous video output. As transmission proceeds, the increased decoder buffer levels permit decreased video delivery rates resulting from bitstream bandwidth demand that exceeds channel bandwidth. This allows fir the video data to be delivered without rate reduction or with less rate reduction, which results in better video quality.

The compressed video data is then scheduled to provide a bitstream comprising compressed video data (110). This ensures that downstream decoder buffer levels are maintained at the minimum required to provide continuous video output.

Once scheduling is complete, the multiplexed bitstream may then be transmitted onto a transmission channel to the target decoder/receiver as desired (112). In one embodiment, the compressed video data is received, processed and transmitted in real-time.

The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818;

"Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference. The structure of an MPEG bitstream is well-known to one of skill in the art and not described in detail for sake of brevity.

The methods of this present invention may be implemented on various systems. For example, the invention may be implemented on network devices such routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Figure 4:
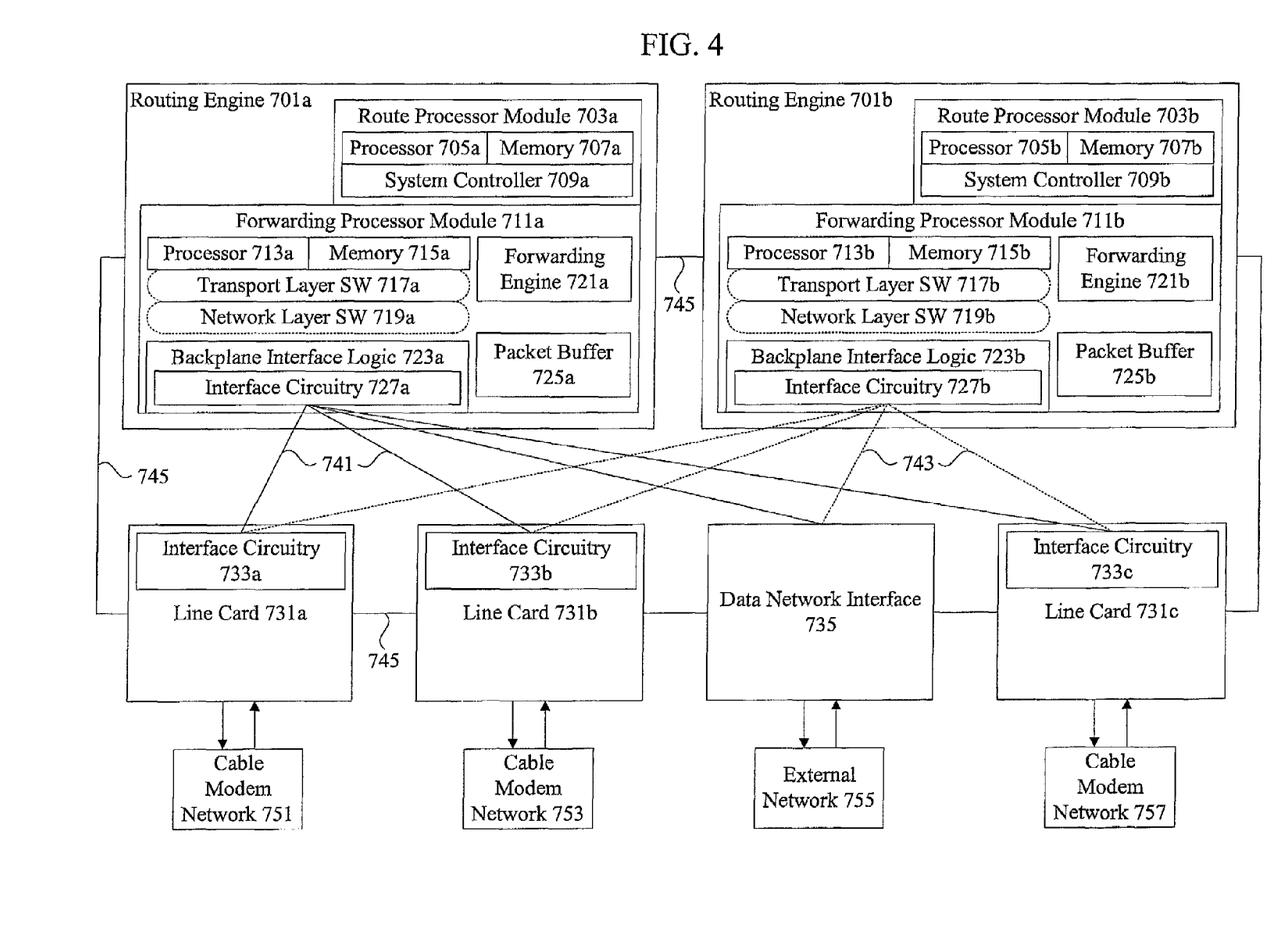
FIG. 4 is a block diagram of a router that may be used in conjunction with the techniques of the present invention.

FIG. 4 shows a block diagram of a specific embodiment of a Cable Modem Termination System (CMTS) 700 which may be used to implement certain aspects of the present invention. As shown in FIG. 4, the CMTS 700 may comprise a plurality of routing engines (e.g. 701*a*, 701*b*).

Each of the routing engines may include a variety of similar modules and/or components. According to a specific embodiment, Routing Engine A may be configured or designed to include a plurality of functionally different modules or components, including, for example, a Forwarding Processor (FP) Module 711*a* adapted to provide packet forwarding functionality; a Route Processor (RP) Module 703*a* adapted to implement routing or forwarding operations; a utility component adapted to provide system clock and timestamp functionality; etc. The routing engine components provide may be configured to provide layer one, layer two, layer three and layer four functionality as well as quality of service (QoS) functionality.

According to a specific implementation, the RP Module 703*a* may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 4, the RP Module 703*a* comprises a general-purpose processor 705*a* (e.g., a MIPS route processor) coupled to a system controller 709*a* and memory 707*a*.

The memory 707*a* may comprise synchronous dynamic random access memory (SDRAM) storage locations addressable by the processor 705*a* for storing software programs, video data, and data structures accessed by the components. A network routing operating system, portions of which may reside in memory and executed by the route processor, functionally organizes the router by invoking network operations in support of software processes executing on the router.

The RP processor 705*a* may be configured to construct and load routing tables used by the FP Module 711*a*. The processor 705*a* may also be configured or designed to perform configuration management functions of the routing engine 701*a*, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727*a* may be coupled to the respective interface circuitry 733*a*, 733*b* of line cards 731*a*, 731*b*. According to various embodiments, the FP Module 711 may comprise a processor 713*a* and memory 715*a* for handling transport layer 717 and network layer 719 functionality. The FP Module 711*a* may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 4, each of the plurality of line cards 731 and 735 are connected to each of the routing engines 701*a*, 701*b* via point-to-point links 741 and 743. One advantage of the point-to-point link configuration is that it provides additional reliability in that the failure of one or more line cards will not interfere with communications between other line cards and the routing engine(s). For example, if Line Card A 731*a* suddenly failed, each of the routing engines would still be able to communicate with the other line cards.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707*a*, 715*a*, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to subscribers. One particular digital service delivers a compressed digital video signal for video streaming or video on demand.

Another particular communication channel that is becoming increasingly common is IP networks and Asynchronous Transfer Mode (ATM) networks. Both networks are based on different transport protocols which can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

While the present invention has been primarily described in terms of transmission based on manipulation of video data compressed according to MPEG standards, the present invention may use other video compression and packaging schemes. Other compression standards suitable for use with the present invention may include MPEGX compression, H.26X compression for video conferencing, compression using proprietary video stream formats, and compression of non-real-time data bit streams, or any other compression formats that use block based compression.

While this invention has been described in terms of several preferred embodiments, there are alterations, permutations, and equivalents which fall within the scope of this invention which have been omitted for brevity's sake. For example, while methods of the present invention have primarily been described with respect to a multiplexer, techniques of the present invention for suitable for used by any scheduling mechanism disposed in a network device. It is therefore intended that the scope of the invention should be determined with reference to the appended claims.

What is claimed is:

1. A network device for transmitting compressed video data onto a channel, the network device comprising:
   a bit rate converter designed or configured to transcode compressed video data from multiple bitstreams to produce multiple transcoded bitstreams;
   a multiplexer designed or configured to
      a) schedule packets from the multiple transcoded bitstreams in a first pass of scheduling in a scheduling period;
      b) determine if bandwidth is available on the channel after the multiple transcoded bitstreams have been scheduled by the multiplexer in the first pass of scheduling, the available bandwidth including a difference between a bandwidth on the channel and a sum of a bandwidth needed for all of the packets from the multiple transcoded bitstreams scheduled in the first pass of scheduling, and if so, allocate additional packets from the multiple transcoded bitstreams in a second pass of scheduling in the scheduling period to use the determined available bandwidth on the channel after the multiple transcoded bitstreams have been scheduled by the multiplexer in the first pass of scheduling; and
   a network interface designed or configured to output the packets from the multiple transcoded bitstreams onto the channel.

2. The network device of claim 1 wherein the multiplexer comprises a bandwidth arbitrator that is designed or configured to divide the available bandwidth among the multiple bitstreams.

3. The network device of claim 2 wherein the bandwidth arbitrator periodically determines and allocates the available bandwidth on a temporal basis.

4. The network device of claim 2 wherein the bandwidth arbitrator periodically determines a decoder buffer level for each of the bitstreams.

5. The network device of claim 2 wherein the multiplexer is designed or configured to alter the scheduling of packets according to the bit rate of incoming bitstreams.

6. The network device of claim 2 further comprising a rate controller, coupled to the bandwidth arbitrator and the bit rate converter, and designed or configured to output a control signal that determines the amount of rate reduction when transcoding the compressed video data.

7. The network device of claim 1 wherein a processor in the network device is designed or configured to model downstream decoder buffer levels corresponding to each of the bitstreams.

8. The network device of claim 1 wherein the multiplexer is included in a statistical multiplexer.

9. A method for transmitting compressed video data onto a channel, the method comprising:
   receiving multiple bitstreams, each bitstream including compressed video data contained in packets;
   transcoding the compressed video data from the multiple bitstreams to produce multiple transcoded bitstreams;

performing a first pass of scheduling in a scheduling period to schedule packets from the multiple transcoded bitstreams;

determining if bandwidth is available on the channel after the multiple transcoded bitstreams have been scheduled by the multiplexer in the first pass of scheduling, the available bandwidth including a difference between a bandwidth on the channel and a sum of a bandwidth needed for all of the packets from the multiple trans coded bitstreams scheduled in the first pass of scheduling;

performing a second pass of scheduling in the scheduling period to allocate additional packets from the multiple transcoded bitstreams to use the determined available bandwidth on the channel after the multiple transcoded bitstreams have been scheduled by the multiplexer in the first pass of scheduling if there is available bandwidth on the channel after the multiple transcoded bitstreams have been scheduled by the multiplexer in the first pass of scheduling; and transmitting the packets from each of the multiple transcoded bitstreams onto the channel.

10. The method of claim 9 wherein the available bandwidth is determined on a periodic basis.

11. The method of claim 10 wherein the available bandwidth is periodically determined on one of a temporal, bit or a packet basis.

12. The method of claim 11 wherein the available bandwidth is periodically determined about every 10 milliseconds to about every 250 milliseconds.

13. The method of claim 9 wherein the available bandwidth is allocated according to a minimum bandwidth requirement for a downstream decoder.

14. The method of claim 9 wherein the available bandwidth is allocated inversely proportional to a downstream decoder buffer level.

15. The method of claim 9 further comprising modeling a downstream decoder buffer level corresponding to one of the multiple bitstreams.

16. The method of claim 15 wherein the available bandwidth is allocated to a bitstream having a lower modeled downstream decoder buffer level than another bitstream having a higher modeled downstream decoder buffer level.

17. The method of claim 15 wherein the available bandwidth on the channel is allocated inversely proportional to the modeled downstream decoder buffer level.

18. The method of claim 9 wherein the available bandwidth on the channel is allocated proportional to the minimum bandwidth requirement of each downstream decoder buffer level.

19. A network device for transmitting compressed video data onto a channel, the network device comprising:

means for receiving multiple bitstreams, each bitstream including compressed video data contained in packets;

means for transcoding compressed video data from the multiple bitstreams to produce multiple transcoded bitstreams;

means for performing a first pass of scheduling in a scheduling period to schedule packets from the multiple transcoded bitstreams;

means for determining if bandwidth is available on the channel after the multiple transcoded bitstreams have been scheduled by the multiplexer in the first pass of scheduling, the available bandwidth including a difference between a bandwidth on the channel and a sum of a bandwidth needed for all of the packets from the multiple transcoded bitstreams scheduled in the first pass of scheduling;

means for performing a second pass of scheduling in the scheduling period to allocate additional packets from the multiple transcoded bitstreams to use the determined available bandwidth on the channel after the multiple transcoded bitstreams have been scheduled by the multiplexer in the first pass of scheduling if there is bandwidth that is available on the channel after the multiple transcoded bitstreams have been scheduled by the multiplexer in the first pass of scheduling; and means for transmitting the packets from each of the multiple transcoded bitstreams onto the channel.

20. The network device of claim 19 further comprising means, coupled to the means for scheduling and the means for transcoding, for outputting a control signal that determines the amount of rate reduction when transcoding the compressed video data.

21. The network device of claim 19 further comprising means for modeling a downstream decoder buffer level corresponding to one of the multiple bitstreams.

22. A computer readable medium storing computer executable instructions for transmitting compressed video data onto a channel, the instructions comprising:

instructions for receiving multiple bitstreams, each bitstream including compressed video data contained in packets;

instructions for transcoding compressed video data from the multiple bitstreams to produce multiple transcoded bitstreams;

instructions for performing a first pass of scheduling in a scheduling period to schedule packets from the multiple transcoded bitstreams;

instructions for determining if bandwidth is available on the channel after the multiple transcoded bitstreams have been scheduled by the multiplexer in the first pass of scheduling, the available bandwidth including a difference between a bandwidth on the channel and a sum of a bandwidth needed for all of the packets from the multiple transcoded bitstreams scheduled in the first pass of scheduling;

instructions for performing a second pass of scheduling in the scheduling period to allocate additional packets from the multiple transcoded bitstreams to use the determined available bandwidth on the channel after the multiple transcoded bitstreams have been scheduled by the multiplexer in the first pass of scheduling if there is bandwidth that is available on the channel after the multiple transcoded bitstreams have been scheduled by the multiplexer in the first pass of scheduling; and instructions for transmitting the packets from each of the multiple transcoded bitstreams onto the channel.

* * * * *